United States Patent Office 3,778,314
Patented Dec. 11, 1973

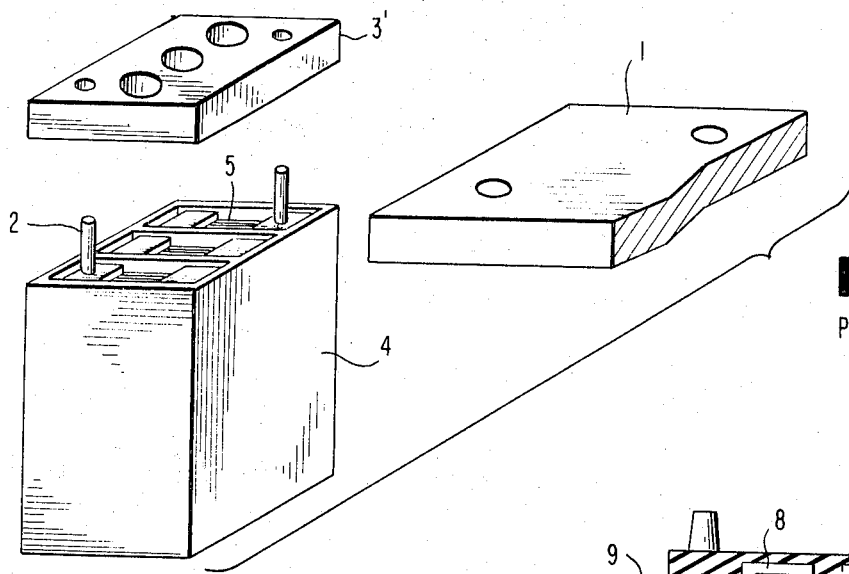
FIG. 1
PRIOR ART
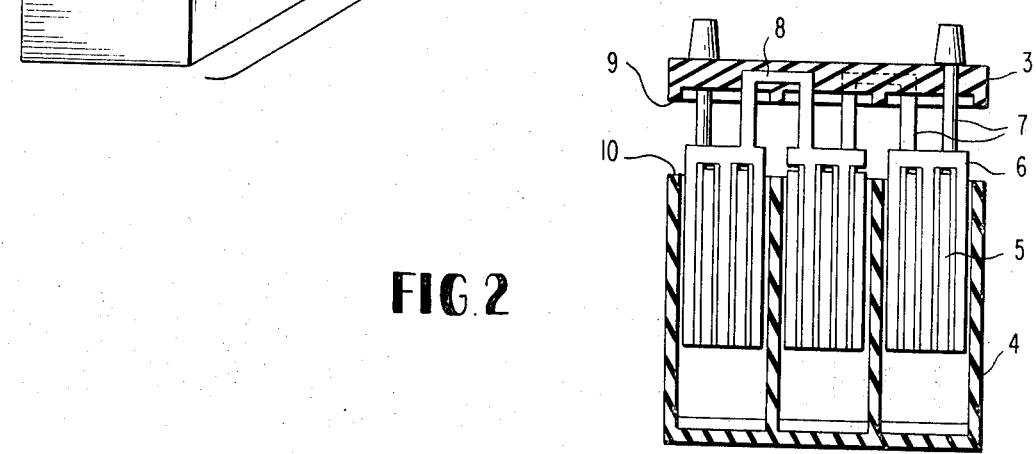
FIG. 2
FIG. 3
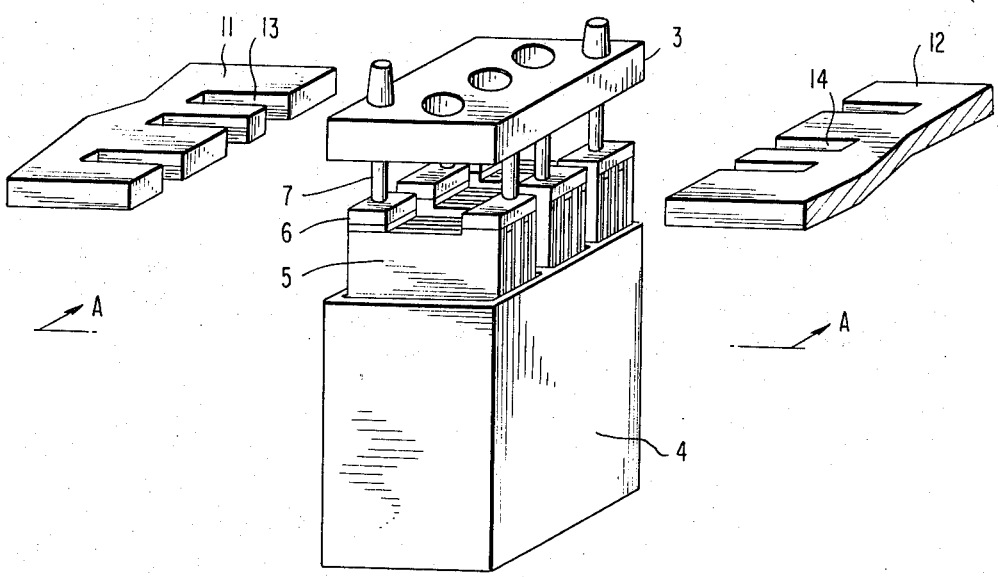

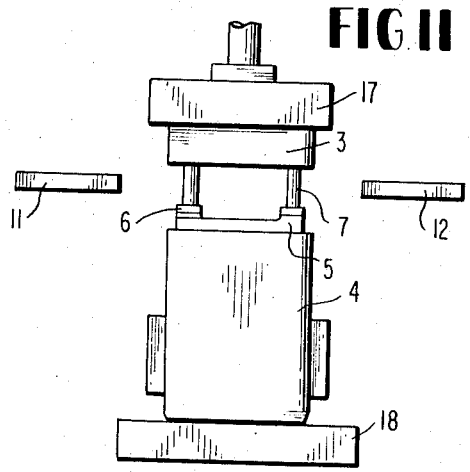
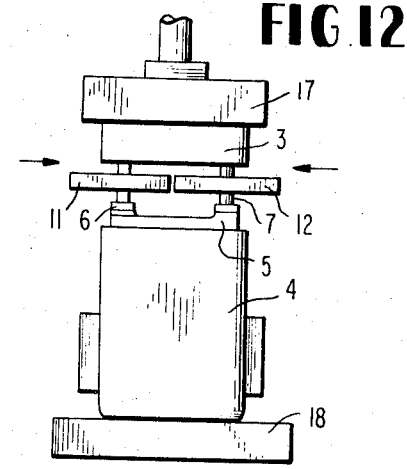
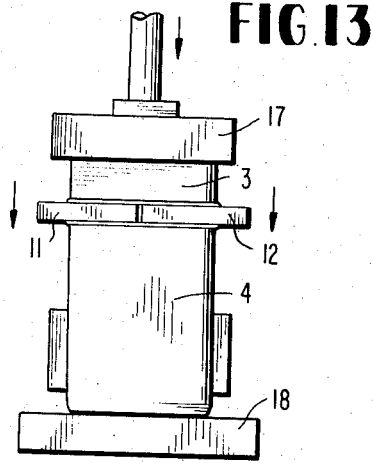
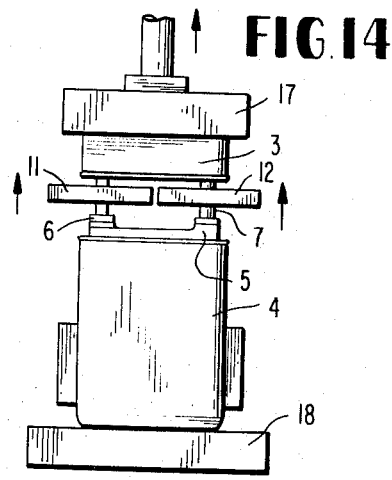
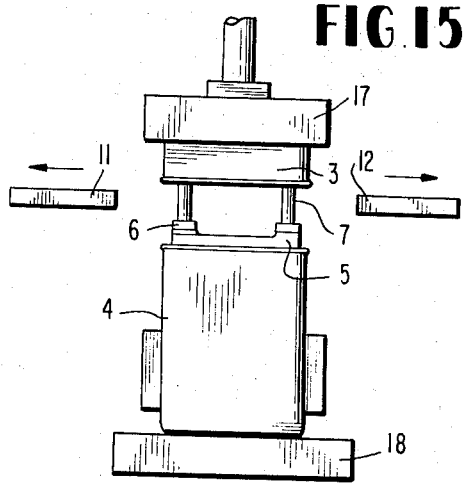
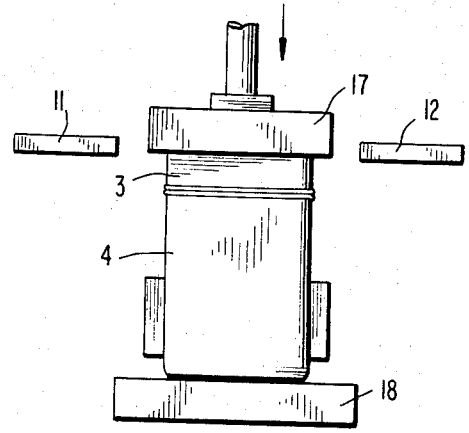

3,778,314
METHOD FOR JOINING COVER AND CASING OF A BATTERY
Seizo Kano, Uji, and Shinsaku Tanaka, Yoshiaki Mizoi, and Kenji Ojima, Kyoto, Japan, assignors to Japan Storage Battery Co., Ltd., Minami-ku, Kyoto-shi, Japan
Filed June 14, 1972, Ser. No. 262,881
Int. Cl. H01m 1/02
U.S. Cl. 136—176     5 Claims

ABSTRACT OF THE DISCLOSURE

A method for joining the cover to the casing of a battery of a type wherein the cover and the casing are made of a thermo-plastic material and poles and connecting bars are embedded beforehand in the cover, involves the steps of elevating the cover a predetermined distance from said casing, inserting a plurality of comb-shaped heating plates having a plurality of slots, between the cover and the casing in such a manner that the poles are accommodated in the slots, depressing the cover so that required portions on the cover and casing are brought into contact with the heating plates, removing the heating plates, and depressing the cover against the casing so that the required portions of the cover and the casing are thereby bonded together completely.

BACKGROUND OF THE INVENTION

Field of the invention

This invention relates to a method for joining a cover to a casing thereof, and more particularly to a method for joining, in a sealing manner, the cover and the casing of a battery, both made of a thermo-plastic material, employing comb-shaped heating plates.

Description of the prior art

Heretofore, where the cover and the casing are made of a thermo-plastic material of a so-called monoblock type battery, and wherein, for instance connectors are provided in the casing to penetrate the cell partitions of the casing, and electrode plates are connected to those connectors, such cover and casing have been joined together in a sealing manner by melting portions of the cover and the casing by employing a heating plate and by joining the melted portions together under an application of a depressive force.

However, in the case of a type of battery wherein the poles and connecting bars are inserted beforehand into the cover of the battery and the electrode plates are connected thereto, it has been impossible to use the heating plate because of the complexity of the construction of the connecting bars and electrode plates existing on the inner side of the cover, necessitating bonding the cover and the casing of this type of battery together by employing an adhesive material. But, because of the employment of the adhesive material, the liquid tightness of the bonded portions are not insured, so the electrolyte is apt to flow into adjacent cells and, further, it is troublesome and inefficient to assemble this type of battery.

In this case, it has been found that the bonded portions between the cover and the casing cannot be sufficiently good to assure the liquid-tightness of these portions, and there is a tendency for the electrolyte to leak from one of the cells to the other. Furthermore, the assembling work of the battery employing the adhesive material requires highly skilled labor, and the production efficiency according to this method is not sufficiently high.

SUMMARY OF THE INVENTION

Therefore, a primary object of the present invention is to provide an improved method for joining the cover of a battery to the casing thereof, wherein no adhesive material is employed and the possibility of causing leakage of the electrolyte can be substantially elminated.

Another object of the invention is to provide an improved method for joining the cover of a battery to the casing thereof, wherein heating plates are employed regardless of the complexity of the connecting bars and poles, and reliable joining of the two members can be thereby assured.

Still another object of the invention is to provide an improved method for joining the cover to the casing thereof, whereby the production efficiency of the battery is greatly elevated.

These and other objects of the present invention can be achieved by this improved method for joining the cover to the casing of a battery of a type in which both the cover and casing are made of a thermo-plastic material and poles and connecting bars are inserted beforehand in the cover, said method comprising the steps of pulling out said cover for a sufficient distance, inserting a plurality of comb-shaped heating plates provided with a suitable number of slots between said cover and said casing in such a manner that said poles are accommodated in said slots, lowering the cover so that the required portions of said cover and casing are placed into contact with the heating plates, heating the required portions of the cover and casing to a temperature near the meting point of the thermo-plastic material constituting the cover and the casing, by said heating plates controlled to a required temperature beforehand, removing the heating plates, and depressing the cover against the casing so that the required portions of the cover and the casing are thereby thermofused completely together.

The nature, principle, and utility of the present invention will be more clearly understood from the following detailed description of the invention when read in conjunction with the accompanying drawings in which like parts are designated by like reference numerals.

BRIEF DESCRIPTION OF THE DRAWINGS

FIG. 1 is a perspective view of a conventional monoblock type battery with its cover lifted upwardly and a heating plate prepared for insertion.

FIG. 2 is a longitudinal section view of the type of battery of the present invention having poles and connection bars inserted beforehand in the cover and wherein heating plates are not yet placed on the rear side of the cover.

FIG. 3 is a perspective view of a battery of the type shown in FIG. 2 employing the method according to the present invention.

FIGS. 11 through 16 are sequenital views taken along the line A—A in FIG. 3 in explanation of the method according to the present invention.

DETAILED DESCRIPTION OF THE INVENTION

Figure 4:
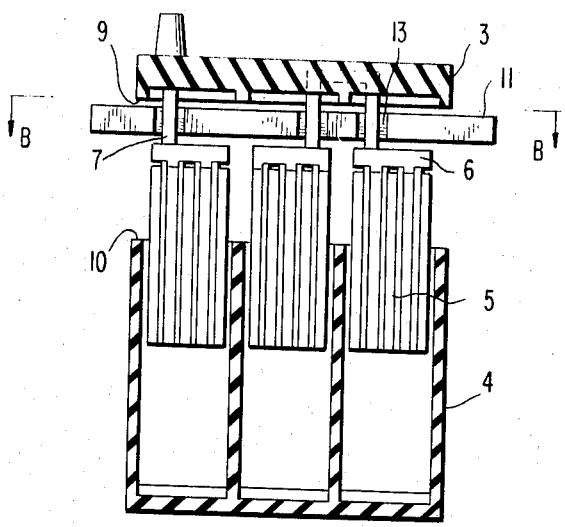
FIG. 4 is a longitudinal sectional view as shown in FIG. 2, but comb-shaped heating plates are placed under the cover.

As conducive to a better understanding of the present invention, the heat-joining method of a conventional mono-block type battery will be described with reference to FIG. 1. In the drawing, there are indicated a cover 3' and a casing 4, both made of a thermo-plastic material, and electrode plates 5 connected, for instance, to connector bars penetrating cell partitions of the casing 4.

A heating plate 1 provided with holes for receiving poles (terminals) 2 of the battery is prepared to be inserted between the cover 3' and the casing 4. When the heating plate 1 is inserted between the cover 3' and the casing 4, portions of the cover 3' and the casing 4 contacting the heating plate 1 are heated to a temperature near the melting point of the thermo-plastic material, and by compressing these heated portions of the cover 3' and the casing 4 together; after the heating plate 1 has been removed, the cover 3' of the mono-block type battery can be heat-joined to the casing 4 thereof.

The above described method, however, cannot be applied to the type batteries wherein the poles and connecting bars of the battery are embedded beforehand in the cover 3 as shown in FIG. 2. In these types of batteries, electrode plate assemblies 5 each consisting of cathode plates, anode plates, and separators are welded to the poles 7 and straps 6 before the cover 3 is joined to the casing 4. For this reason, the heating plate 1 of the above described construction cannot be inserted under the cover 3.

Accordingly, in these types of batteries, the cover is joined to the casing employing an adhesive material as described hereinbefore, and various disadvantages such as the possibility of leaking the electrolyte, requiring skilled labors, or inefficiency in the production have accompanied such procedures.

According to the present invention, the employment of the adhesive material is utterly eliminated, and the cover and the casing of this type of batteries are also heat-joined as in the case of batteries of the type shown in FIG. 1.

Figure 5:
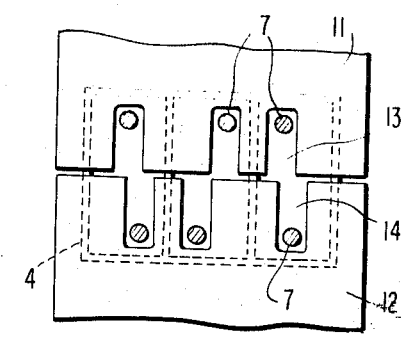
FIGS. 5 through 7 are plan views of various types of the comb-shaped heating plates looking from the line B—B in FIG. 4.
Figure 6:
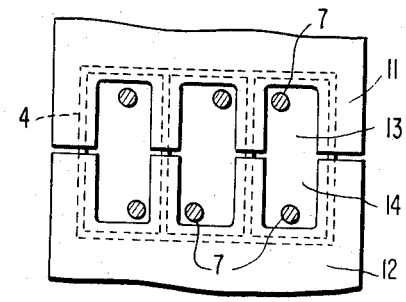
Figure 7:
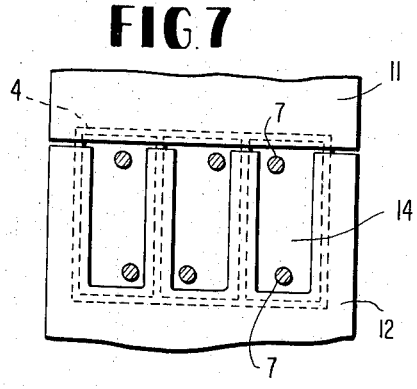

For this purpose, the heating plate to be employed in the present invention is divided in, for instance, two parts 11 and 12, as shown in FIG. 3, and for avoiding the interference of the poles 7, the two parts 11, 12 of the heating plate are provided with a plurality of slots 13, 14, respectively, as best shown in FIG. 5. Otherwise, the slots may be enlarged as shown in FIG. 6 leaving portions of the heating plate only for the required portions of the cover and the casing to be joined together. Alternatively, the two parts of the heating plate may be constructed as shown in FIG. 7 so that the confronting edges of the two parts are disposed offset from the longitudinal center line of the battery. When the size of the slots is enlarged as shown, there is no possibility of the poles being melted during heating of the cover and casing, and only the required portions of the two members heated to the required temperature. The number of the slots in the comb-shaped heating plates may be determined in accordance with the number of cells in the battery, or they may be selected to accommodate poles for several batteries at one time.

Figure 8:
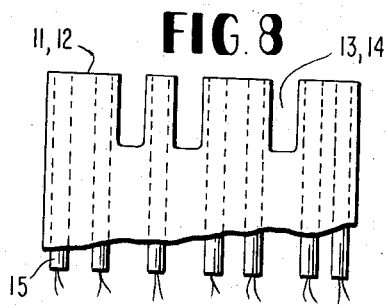
FIGS. 8 through 10 are plan views of various types of comb-shaped heating plate wherein various manners of disposition of the heating elements are indicated schematically.
Figure 9:
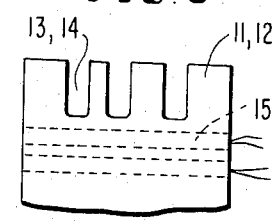
Figure 10:
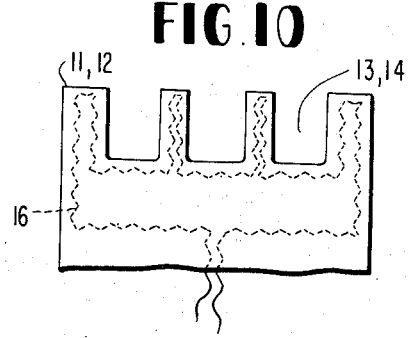

In FIGS. 8 through 10, there are indicated three different examples of the heating plate. In the examples of FIGS. 8 and 9, cartridge type or sheath type electric heating elements are employed, thus facilitating the replacement of the electric heating elements. An example shown in FIG. 9, is used for a small type battery wherein the electric heating elements cannot be inserted to the tips of the comb-like heating plates as it was in the case of the example shown in FIG. 8. In still another example, shown in FIG. 10, electric heating wires or ribbons are directly embedded in the body of the heating plate or are inserted between upper and lower plates of the same comb-like configuration. Other than those indicated in FIGS. 8 through 10, various types of heating plates may also be considered. For instance, heat may be conducted from a supporting member of the heating plates, or a radiant heat may also be utilized for the heating plates. In all of these examples, it is essential that no temperature difference is created throughout the heating plates, and it is also important that two of the heating plates are kept in alignment when these are placed in an abutting relationship.

Referring to FIGS. 11 through 16, the joining steps of this invention will be described in more detail. Before the first step of this invention, the battery to be joined is placed in the state shown in FIG. 2. In its first step shown in FIG. 11, the cover 3 of the battery is elevated to a predetermined height by a cover supporting device 17 so that the pair of heating plates 11 and 12 can be inserted smoothly into a space between the cover 3 and the casing 4 (also refer to FIG. 4). In the second step shown in FIG. 12, the pair of heating plates 11 and 12 are abutted to each other and placed in a completely aligned condition. In this case, because of the provision of the plurality of slots, the heating plates do not touch the poles of the battery.

In the third step shown in FIG. 13, the cover supporting device 17 descends. In this case, the heating plates 11 and 12 also descend together with the cover 3 in the completely aligned state, and the required portions 9 and 10 on the cover 3 and the casing 4 contacting the heating plates are heated to a desired temperature. In the next step shown in FIG. 14, the cover supporting device 17 is again elevated to the initial position together with the cover 3 and the heating plates 11 and 12. The heating plates are separated from the cover during this elevation.

In the subsequent step shown in FIG. 15, the pair of heating plates 11 and 12 are separated from each other and shifted laterally to their original positions as shown in FIG. 11. In the last step shown in FIG. 16, the cover supporting device 17 again descends so that the portion 9 on the underside of the cover 3 abuts the portion 10 on the casing 4, and both heated portions 9 and 10 are completely joined together. The cover 3 and the casing 4 are maintained under a depressed condition until the joined portions are cooled and solidified.

Although in the above descriptions, an example of elevating and descending the cover supporting device 17 has been explained, it may also be so arranged that the cover supporting device 17 and also a battery mounting device (for instance, rollers) 18 are both moved vertically, whereby the joining operation can be achieved by only shifting the heating plates 11 and 12 horizontally. Otherwise, the joining operation may also be accomplished by elevating and descending the battery mounting device 18 only without moving the cover supporting device 17. Furthermore, in a particular case, the entire battery may be placed upside-down so that the cover 3 is located under the casing 4 and the joining operation may be carried out in this condition.

In the method of the present invention, since a plurality of comb-shaped heating plates having slots as described above have been employed, a type of battery which comprises a casing and a cover attached with electrode plate assemblies as described and shown in FIG. 2 can be joined in a simple manner as well as a type of battery shown in FIG. 1.

What is claimed is:

1. A method for joining a cover to a casing of a battery of a type wherein both the cover and the casing are made of a thermo-plastic material and poles and connecting bars are embedded beforehand in the cover, said method comprising the steps of:

elevating said cover a predetermined distance above said casing, inserting a plurality of heating plates having a plurality of slots between said cover and casing in such a manner that said poles are accommodated in said slots, lowering the cover so that portions of said cover and casing are brought into contact with the heating plates, heating the required portions of the cover and casing to a temperature near the melting point of the thermoplastic material, removing the heating plates, and depressing the cover against the casing so that the heated portions of the cover and the casing are thereby heat fused completely together.

2. The method as set forth in claim 1, wherein said plurality of heating plates are comb-shaped plates and are placed in abutment together along opposed longitudinal edges.

3. The method as set forth in claim 1, wherein said heating plates are provided with electric heating elements and said elements are heat-controlled at a required temperature.

4. The method as set forth in claim 1, wherein said heating plates are provided with a plurality of slots extending in the lateral direction.

5. The method as set forth in claim 1, wherein said heating plates are slotted to a sufficient width so that when the heating plates are placed between the cover and the casing, the peripheral edges of the slots are spaced apart from the poles by a sufficient distance to prevent the conduction of the heat from the heating plates to the poles.

References Cited

UNITED STATES PATENTS

| | | | |
|---|---|---|---|
| 3,629,010 | 12/1971 | Hahn | 136—170 |
| 3,684,582 | 8/1972 | Roberts | 136—176 |
| 3,686,056 | 8/1972 | Fiandt | 136—176 |

FOREIGN PATENTS

| | | | |
|---|---|---|---|
| 4,228 | 10/1967 | Australia | 136—176 |

DONALD L. WALTON, Primary Examiner

U.S. Cl. X.R.

156—306